(12) United States Patent
Kuroda

(10) Patent No.: US 8,419,033 B2
(45) Date of Patent: Apr. 16, 2013

(54) STABILIZER DEVICE AND METHOD OF MANUFACTURING SAME

(75) Inventor: Shigeru Kuroda, Yokohama (JP)

(73) Assignee: NHK Spring Co., Ltd., Yokohama-Shi (JP)

( * ) Notice: Subject to any disclaimer, the term of this patent is extended or adjusted under 35 U.S.C. 154(b) by 123 days.

(21) Appl. No.: 13/054,871

(22) PCT Filed: Jul. 22, 2009

(86) PCT No.: PCT/JP2009/063098
§ 371 (c)(1),
(2), (4) Date: Jan. 19, 2011

(87) PCT Pub. No.: WO2010/013622
PCT Pub. Date: Feb. 4, 2010

(65) Prior Publication Data
US 2011/0169242 A1    Jul. 14, 2011

(30) Foreign Application Priority Data
Jul. 29, 2008 (JP) ................................ 2008-194556

(51) Int. Cl.
*B60G 9/00* (2006.01)
(52) U.S. Cl.
USPC .................................................. 280/124.164
(58) Field of Classification Search ........... 280/124.164, 280/124.165, 124.166, 124.152; 267/124.107, 267/276, 292, 293, 140.12, 141.2, 141.4
See application file for complete search history.

(56) References Cited

U.S. PATENT DOCUMENTS

| | | | |
|---|---|---|---|
| 5,884,926 A * | 3/1999 | Muzio et al. | 280/124.107 |
| 7,828,308 B2 * | 11/2010 | Hansson et al. | 280/124.152 |
| 2002/0170177 A1 | 11/2002 | Koyama et al. | |
| 2003/0175073 A1 * | 9/2003 | Funke | 403/345 |
| 2007/0085295 A1 | 4/2007 | Johnson et al. | |

FOREIGN PATENT DOCUMENTS

| | | |
|---|---|---|
| EP | 0 496 949 A1 | 8/1992 |
| EP | 0 900 677 A1 | 3/1999 |
| JP | A-2001-163026 | 6/2001 |
| JP | A-2001-165127 | 6/2001 |
| JP | B-3716750 | 11/2005 |
| WO | WO 2006/126772 A1 | 11/2006 |

OTHER PUBLICATIONS

Search Report issued in International Application No. PCT/JP2009/063098 dated Oct. 27, 2009.

* cited by examiner

*Primary Examiner* — Faye M. Fleming
(74) *Attorney, Agent, or Firm* — Oliff & Berridge, PLC

(57) ABSTRACT

A stabilizer apparatus includes: a stabilizer which has a torsion portion and arm portions extending from both end portions of the torsion portion so as to have an approximate U-shape; a bush which is provided at both the end portions of the torsion portion and is used for fixing the stabilizer to a vehicle body; and a movement stopper member which is made of resin, has a contact portion contacting the bush, and is integrally molded to the torsion portion so as to cover overall periphery of predetermined range of the torsion portion in an axial direction thereof, wherein a concavo-convex structure engaging with the movement stopper member is provided on a peripheral surface of the torsion portion. The reliability can be improved by preventing of the movement of the bush.

8 Claims, 9 Drawing Sheets

STABILIZER DEVICE AND METHOD OF MANUFACTURING SAME

TECHNICAL FIELD

The present invention relates to a stabilizer apparatus provided to vehicles, and relates to a production method therefor.

BACKGROUND ART

When a vehicle having a stabilizer apparatus runs at a curve, inputs are provided to a left suspension mechanism and a right suspension mechanism so as to have phases opposite to each other in an upper direction and in a lower direction, a left arm portion and a right arm portion bend in directions opposite to each other, and a torsion portion is twisted in a stabilizer of the stabilizer apparatus. In this manner, the stabilizer of the stabilizer apparatus functions as a spring inhibiting the vehicle roll. The stabilizer apparatus has been fixed to a vehicle body of vehicle by fastening a bracket with a bolt via a bush which is made of rubber and is provided in the stabilizer.

However, a load is generated by centrifugal force when a vehicle runs at a curve, and the position of the bush to the torsion portion is moved by the load against frictional force therebetween. Even when opposite centrifugal force is generated or the vehicle runs straight, the bush does not return the initial position, and the movement of the bush is maintained. Due to this, for example, anti-roll effect by the stabilizer cannot be obtained, excessive load is provided to stabilizer links which are connected to both ends of the stabilizer, and interference risk of the stabilizer with surrounding parts thereof may be high.

In order to prevent the movement of the bush, an aluminum ring or an iron ring is caulked so as to be used as a movement stopper member. Two of the movement stopper members are used for one stabilizer so as to be respectively disposed at a left side and a right side of the stabilizer. On the other hand, in order to prevent the movement of the bush, the bush made of rubber may be directly fixed at the torsion portion by using an adhesive or by performing heat curing.

In a production method for a hollow stabilizer apparatus using an aluminum ring as a movement stopper member, first, for example, an electroseamed pipe, which has a predetermined length by cutting, is subjected to cold working, so that the electroseamed pipe is formed into a stabilizer shape. Next, heating such as hardening and tempering is performed on the half-finished stabilizer. Next, shot peening, in which shots are projected onto the half-finished stabilizer, is performed on the half-finished stabilizer. Next, the half-finished stabilizer is subjected to coating. Next, an aluminum ring, which is half-divided or composed of two pieces, is caulked so as to be used as a movement stopper member.

In a production method for a hollow stabilizer apparatus using an iron ring as a movement stopper member, first, for example, an electroseamed pipe, which has a predetermined length by cutting, is subjected to bending working, so that an arm portion is formed. Next, the electroseamed pipe having the arm portion passes through an iron ring having a C-shape. An end portion of the arm portion is subjected to working. For example, a flattened portion or a mounting hole, at which the stabilizer link is mounted, is formed at the end portion of the arm portion by forging or the like. The iron ring is caulked, and coating is performed.

In a fixing method of a bush made of rubber, the bush is integrally molded by injection molding to a torsion portion of a stabilizer, and the bush is subjected to heat curing so as to be cured. This technique is disclosed in Japanese Unexamined Patent Application Publication Nos. 2001-163026 and 2001-165127.

However, in the method using the aluminum ring, the aluminum ring, which is half-divided or composed of two pieces, is caulked so as to be fixed to the torsion portion. This aluminum ring has a connection portion which is a weak structure, so that the strength of the aluminum ring is low. Due to this, when the aluminum ring receives a load, the caulked condition of the aluminum ring is easily broken. Thus, the fix strength of the aluminum ring is easily deteriorated, and the fix positions of the stabilizer at the left side and the right side of the vehicle are unbalanced, and the effects by the stabilizer cannot be obtained sufficiently during running of the vehicle at a curve. As a result, the reliability of the stabilizer apparatus is not sufficient.

The peripheral surface of the torsion portion on which the aluminum ring, the iron ring, or the bush is mounted is almost smooth. Due to this, in the case that the aluminum ring or the iron ring is caulked so as to be provided on the torsion portion or the bush made of rubber is cured so as to be provided thereon, when the bush receives a load by centrifugal force, the bush easily moves. Thus, the fix positions of the stabilizer at the left side and the right side of the vehicle are unbalanced, and the effects by the stabilizer cannot be obtained sufficiently during running of the vehicle at a curve. As a result, the reliability of the stabilizer apparatus is not sufficient.

When the aluminum ring and the iron ring are used for the movement stopper member, they are heavier than the resin movement stopper. Due to this, the weight of the stabilizer apparatus cannot be reduced. The aluminum ring is higher than the iron ring in deformation resistance, and the aluminum ring is thereby formed in a circular shape so as to be easily caulked. Due to this, it is necessary that the torsion portion pass through the aluminum ring before a flattened portion or a mounting hole, at which the stabilizer link is mounted, is formed at the end portion of the arm portion by forging or the like. That is, it is necessary that the electroseamed pipe passes through the iron ring after bending forming of the electroseamed pipe and before coating of the half-finished stabilizer. Due to this, it is necessary to perform working for forming of a flattened portion or a mounting hole without falling and separating of the iron ring which is not caulked, so that handling is troublesome.

DISCLOSURE OF THE INVENTION

An object of the present invention is to provide a stabilizer apparatus of which the reliability can be improved by preventing of the movement of the bush.

According to one aspect of the present invention, a stabilizer apparatus includes: a stabilizer which has a torsion portion and arm portions extending from both end portions of the torsion portion so as to have an approximate U-shape; a bush which is provided at both the end portions of the torsion portion and is used for fixing the stabilizer to a vehicle body; and a movement stopper member which is made of resin, has a contact portion contacting the bush, and is integrally molded to the torsion portion so as to cover overall periphery of predetermined range of the torsion portion in an axial direction thereof, wherein a concavo-convex structure engaging with the movement stopper member is provided on a peripheral surface of the torsion portion.

According to another aspect of the present invention, a stabilizer apparatus includes: a stabilizer which has a torsion portion and arm portions extending from both end portions of the torsion portion so as to be approximately U-shaped; and a bush which is made of resin and is integrally molded to the torsion portion so as to cover overall periphery of predetermined range of the torsion portion in an axial direction thereof, wherein a concavo-convex structure engaging with the bush is provided on a peripheral surface of the torsion portion.

In the aspect of the present invention, the convex of the bush or the movement stopper member enters the recess of the concave-convex portion, so that the bush or the movement stopper member engages with the concave-convex portion. Thus, even when a vehicle runs at a curve, centrifugal force is generated, and the bush receives a load by the centrifugal force in the axial direction of the torsion portion, the movement of the bush or the movement stopper member in the axial direction of the torsion portion can be prevented, and the movement resistance force, by which the movement of the bush from the fixed position thereof is prevented, can be realized. As a result, the stabilizer can give the predetermined designed performance, so that the reliability of the stabilizer apparatus can be improved.

The concave-convex portion may be formed by providing a recess or convex on two facing surfaces of the torsion portion. Alternatively, the concave-convex portion may be a corrugated concave-convex portion or a groove-like concave-convex portion. A corrugated concave-convex portion or a groove-like concave-convex portion may be formed on overall periphery of the torsion portion. A knurling mesh concave-convex portion may be formed on overall periphery of the torsion portion.

The resin of the movement stopper member may be polyphenylene sulfide, polyether ether ketone, or the like. The resin of the bush may be rubber. For example, when the resin of the movement stopper member is polyphenylene sulfide, polyether ether ketone, or the like, the injection condition is selected when the movement stopper member is formed by direct injection, so that generation of burr or the like can be prevented. When drying of paint in coating of the stabilizer is performed after injection molding of the movement stopper member, the materials such as polyphenylene sulfide and polyether ether ketone may be resistant to heat during the drying and may have a strength.

According to a preferred embodiment of the present invention, the concavo-convex structure has a recess and a convex, and height difference between surfaces of the recess and the convex of the concavo-convex structure is 0.5 to 5.0 mm. In this embodiment, when the concave-convex portion is formed by providing a recess, movement resistance force may act by the concave-convex portion, and the strength of the torsion portion can be maintained. When the concave-convex portion is formed by providing a convex, the stabilizer apparatus can be compact, and the interference of the stabilizer apparatus with surrounding parts thereof can be prevented. As a result, the stabilizer apparatus having high reliability can be produced.

According to a preferred embodiment of the present invention, the movement stopper member has a inclined portion at a side of the bush such that the contact portion is disposed between the bush and the movement stopper member, and the inclined portion has an outer diameter which is smaller with increasing distance from the bush in the axial direction of the torsion portion. In this embodiment, when centrifugal force acts on the vehicle body and the bush receives a load by the centrifugal force in the axial direction of the torsion portion, the bush may bend toward the movement stopper member. Thus, a load may be applied onto the peripheral side portion of the contact portion of the movement stopper member, so that the moment may act on the movement stopper member toward the axial direction of the torsion portion. That is, the peripheral surface of the torsion portion may be pressed by the inner peripheral surface of the movement stopper member, and a load may be applied from the movement stopper member to the torsion portion. Therefore, the movement stopper member may strongly engage with the torsion portion, and the movement resistance force by the movement stopper member can be high. As a result, the movement of the bush can be further prevented, and the reliability of the stabilizer apparatus can be further improved. In this embodiment, the inclination portion may be tapered. The inclination portion may have a cross section which is parabolic or circular. The inclination portion may be a rib which has a tapered shape or has a cross section which is parabolic or circular.

According to a preferred embodiment of the present invention, the contact portion is a recess or a convex provided at a periphery side of the movement stopper member, and the bush engages with the recess or the convex of the movement stopper member so as to cover a periphery surface of the movement stopper member. In this embodiment, when centrifugal force acts on the vehicle body and the bush receives a load by the centrifugal force in the axial direction of the torsion portion, the recess or the convex of the movement stopper member may contact the bush, and the bush may prevent the movement of the bush in the axial direction of the torsion portion, the movement resistance force, by which the movement of the bush from the fixed position thereof is prevented, can be realized. As a result, the stabilizer can give the predetermined designed performance, so that the reliability of the stabilizer apparatus can be improved.

According to another aspect of the present invention, a production method for stabilizer apparatus includes: first forming that a bar is formed into an approximate U-shape, and a half-finished stabilizer is obtained; second forming that a concave-convex structure is formed on a shoulder portion of a torsion portion of the half-finished stabilizer; heating the half-finished stabilizer; shot peening that shots are projected onto the half-finished stabilizer; and injection molding that a movement stopper member is integrally molded to the concave-convex structure of the shoulder portion of the torsion portion by direct injection of resin so as to engage with the concavo-convex portion.

According to another aspect of the present invention, a production method for stabilizer apparatus includes: first forming that a bar is formed into an approximate U-shape, and a half-finished stabilizer is obtained; second forming that a concave-convex structure is formed on a shoulder portion of a torsion portion of the half-finished stabilizer; heating the half-finished stabilizer; shot peening that shots are projected onto the half-finished stabilizer; and injection molding that a bush is integrally molded to the concave-convex structure of the shoulder portion of the torsion portion by direct injection of resin so as to engage with the concavo-convex portion.

According to the aspect of the present invention, the resin for the movement stopper member or the bush enters the recess of the concave-convex portion, so that the convex is formed on the movement stopper member or the bush. In this manner, the convex of the movement stopper member or the bush enters the recess of the concave-convex portion, and the movement stopper member or the bush engages with the concave-convex portion. Therefore, in comparison with caulking of the aluminum ring having a convex formed thereon, a gap between the concave-convex portion and the movement stopper member or the bush is smaller, and the concave-convex portion and the movement stopper member or the bush more strongly engage with each other, so that the movement resistance force can be more stable. As a result, the movement of the bush can be prevented, and the reliability of the stabilizer apparatus can be improved.

According to the present invention, the stabilizer apparatus, of which the reliability can be improved by preventing of the movement of the bush, can be produced.

EXPLANATION OF REFERENCE NUMERALS

Figure 1:
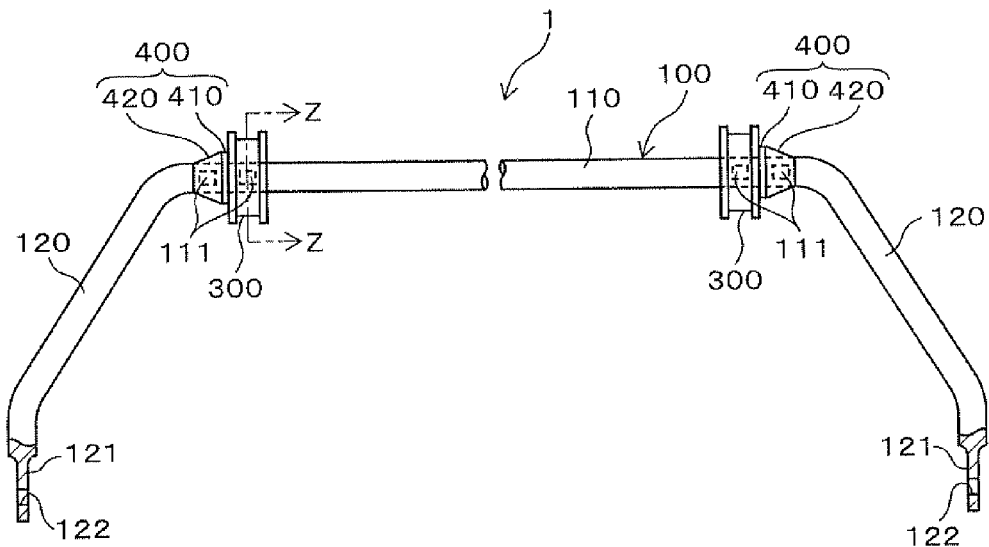
FIG. 1 is a diagram which shows a stabilizer apparatus.

Reference numeral 1 denotes a stabilizer apparatus, 10 denotes a vehicle body, 100 denotes a stabilizer, 110 denotes a torsion portion, 111 denotes a concave-convex portion, 120 denotes an arm portion, 300 denotes a bush, 400 denotes a movement stopper member, 410 denotes a contact portion, 420 denotes a tapered portion, 901 denotes a recess.

BEST MODE FOR CARRYING OUT THE INVENTION

1. First Embodiment
Construction of Stabilizer Apparatus

Figure 2:
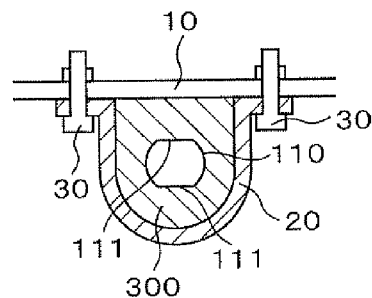
FIG. 2 is a cross sectional view which is taken along Z-Z line in FIG. 1 and shows the stabilizer apparatus fixed to a vehicle body.
Figure 3:
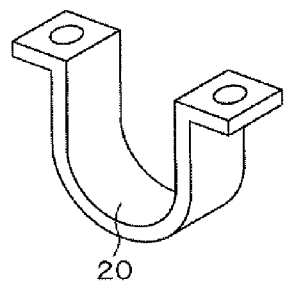
FIG. 3 is a perspective view which shows a bracket.
Figure 4A:
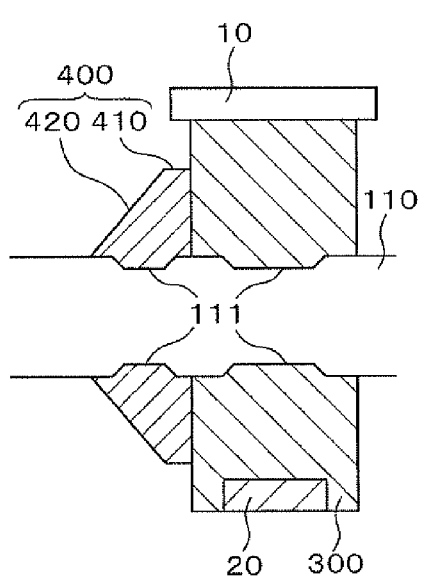
FIGS. 4A and 4B are enlarged cross sectional views which show periphery of a movement stopper member.
Figure 4B:
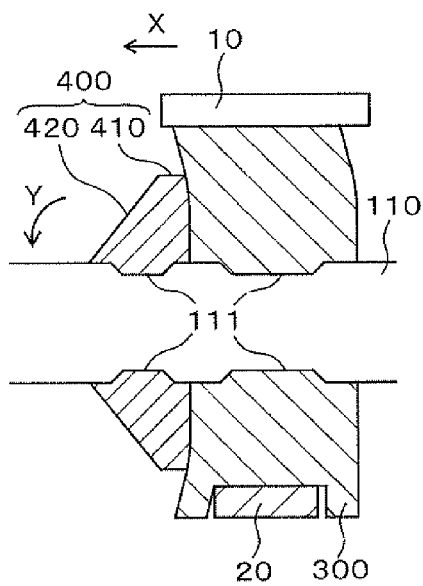
Figure 5A:
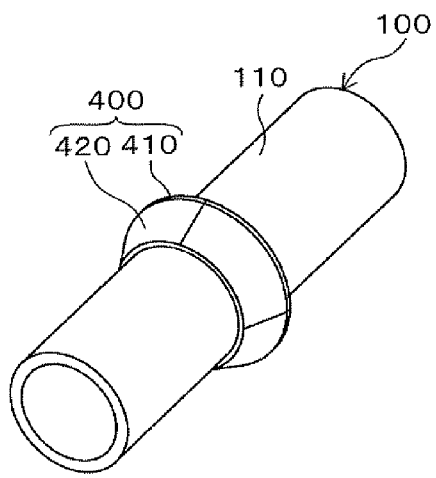
FIGS. 5A and 5B are perspective views which show a movement stopper member.
Figure 5B:
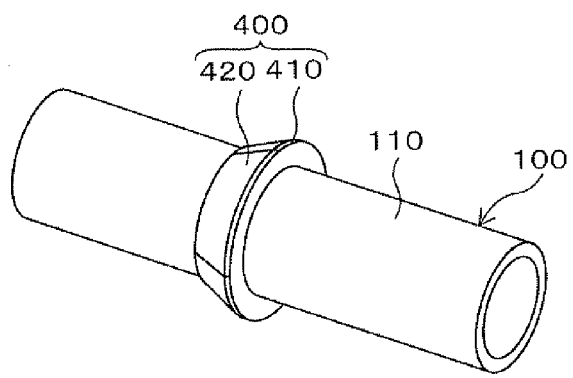
Figure 6:
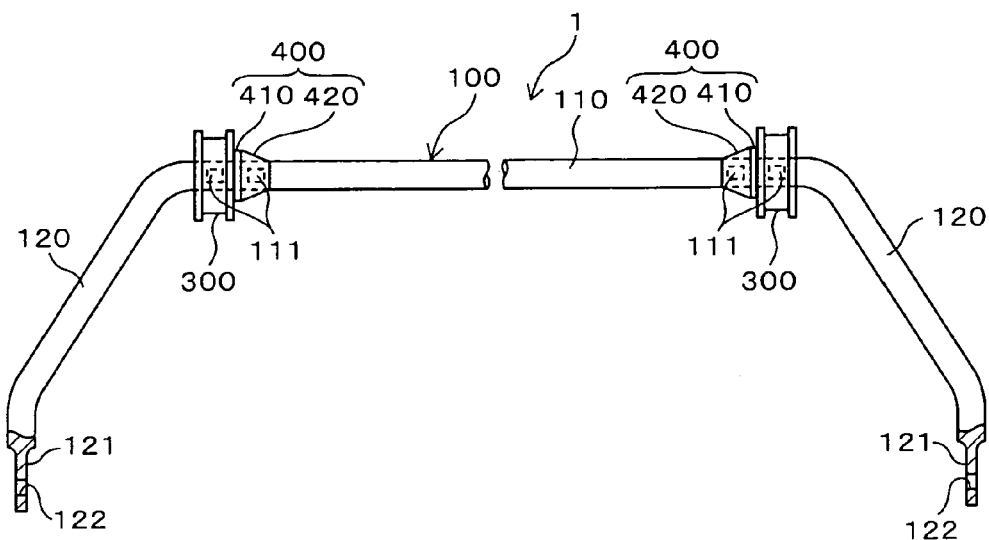
FIG. 6 is a diagram which shows another embodiment in which a movement stopper member is provided at the inside of the stabilizer apparatus.
Figure 7A:
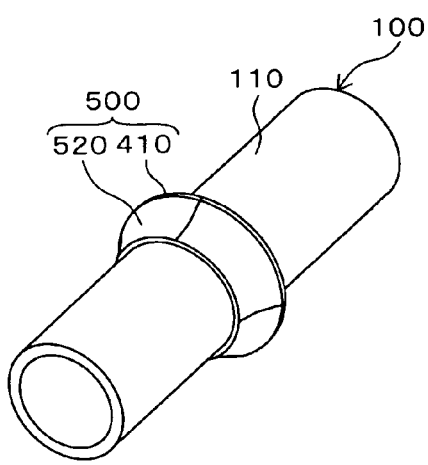
FIGS. 7A and 7B are diagrams which show a first modification example of the movement stopper member.
Figure 7B:
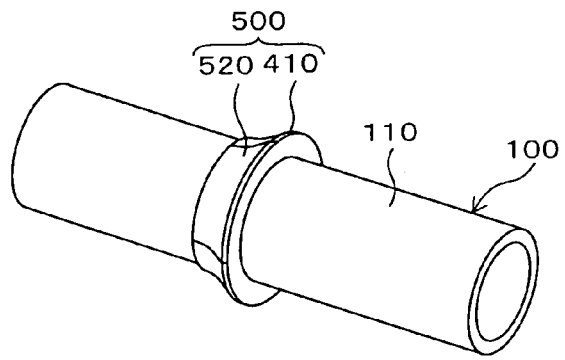
Figure 8A:
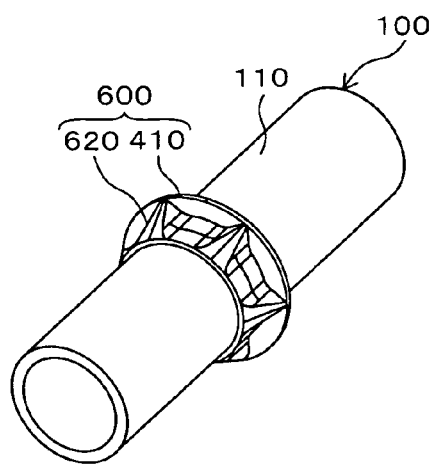
FIGS. 8A and 8B are diagrams which show a second modification example of the movement stopper member.
Figure 8B:
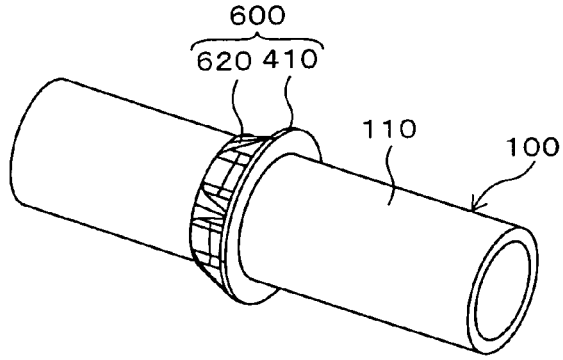
Figure 9A:
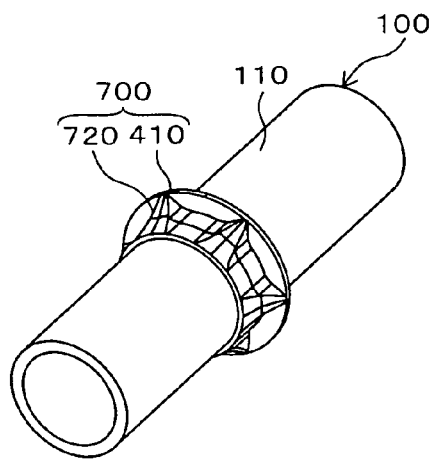
FIGS. 9A and 9B are diagrams which show a third modification example of the movement stopper member.
Figure 9B:
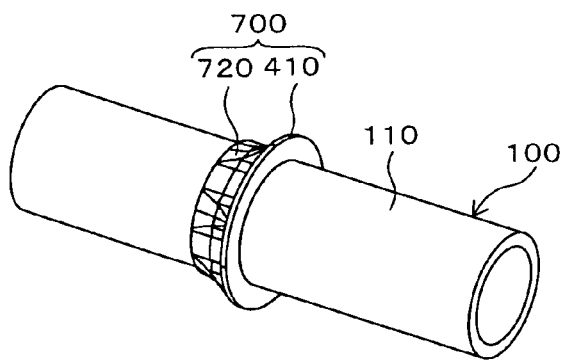
Figure 10A:
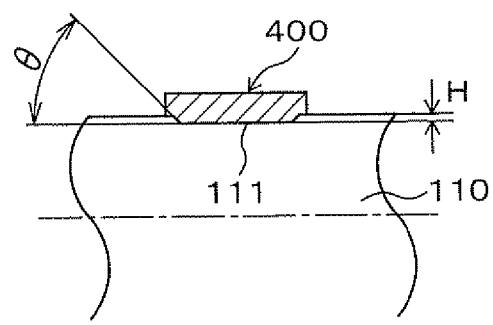
FIGS. 10A and 10B are enlarged diagrams which show periphery of a concave-convex portion.
Figure 10B:
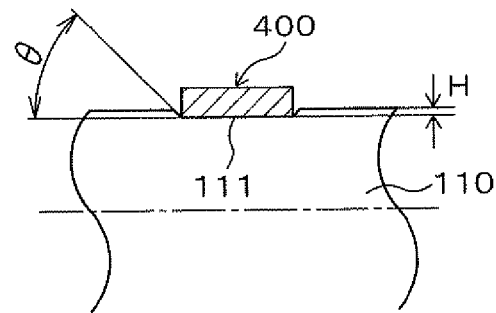
Figure 11A:
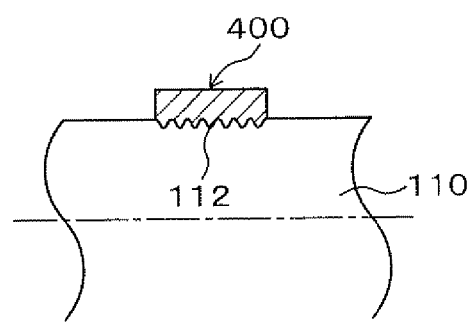
FIGS. 11A and 11B are diagrams which show a first modification example of the concave-convex portion.
Figure 11B:
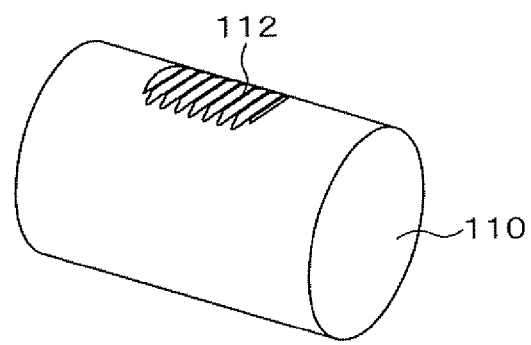
Figure 12A:
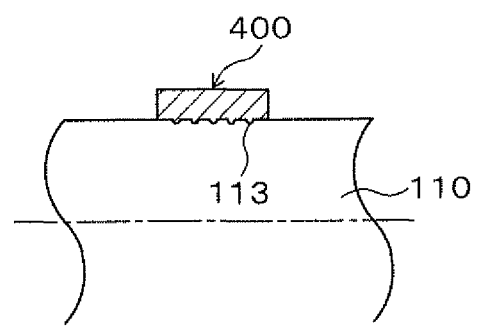
FIGS. 12A and 12B are diagrams which show a second modification example of the concave-convex portion.
Figure 12B:
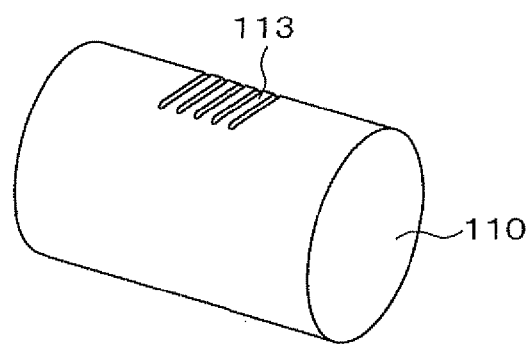
Figure 13:
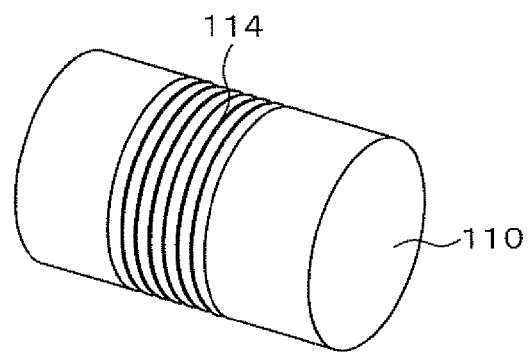
FIG. 13 is a diagram which shows a third modification example of the concave-convex portion.
Figure 14:
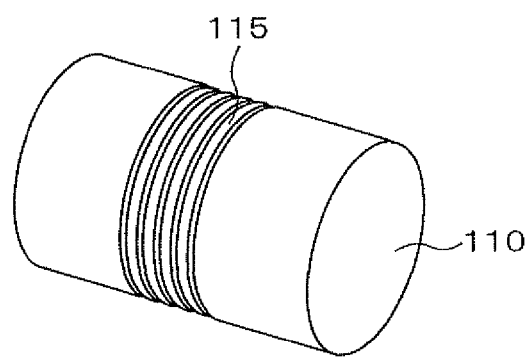
FIG. 14 is a diagram which shows a fourth modification example of the concave-convex portion.
Figure 15:
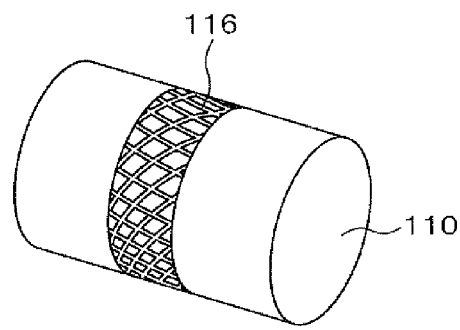
FIG. 15 is a diagram which shows a fifth modification example of the concave-convex portion.

One embodiment of the present invention will be explained hereinafter. FIG. 1 is a diagram which shows a stabilizer apparatus. FIG. 2 is a cross sectional view which is taken along Z-Z line in FIG. 1 and shows the stabilizer apparatus fixed to a vehicle body. FIG. 3 is a perspective view which shows a bracket. FIGS. 4A and 4B are enlarged cross sectional views which show periphery of a movement stopper member. FIG. 4A shows a condition in which centrifugal force does not act, and FIG. 4B shows a condition in which centrifugal force acts. FIGS. 5A and 5B are perspective views which show a movement stopper member. FIG. 6 is a diagram which shows another embodiment in which a movement stopper member is provided at the inside of the stabilizer apparatus. FIGS. 7A and 7B are diagrams which show a first modification example of the movement stopper member. FIGS. 8A and 8B are diagrams which show a second modification example of the movement stopper member. FIGS. 9A and 9B are diagrams which show a third modification example of the movement stopper member. FIGS. 10A and 10B are enlarged diagrams which show periphery of a concave-convex portion. FIG. 10A is an enlarged diagram show periphery of a concave-convex portion of the first embodiment, and FIG. 10B is a diagram showing a case in which the length of the movement stopper member is changed. FIGS. 11A and 11B are diagrams which show a first modification example of the concave-convex portion. FIGS. 12A and 12B are diagrams which show a second modification example of the concave-convex portion. FIG. 13 is a diagram which shows a third modification example of the concave-convex portion. FIG. 14 is a diagram which shows a fourth modification example of the concave-convex portion. FIG. 15 is a diagram which shows a fifth modification example of the concave-convex portion.

The stabilizer apparatus 1 is equipped with a stabilizer 100, a bush 300, a movement stopper member 400, and the like. The stabilizer 100 has a torsion portion 110 and arm portions 120. In the stabilizer 100, the torsion portion 110, the arm portions 120, and the like are formed such that a hollow pipe (for example, electroseamed pipe) or a bar (for example, a solid pipe) is subjected to working. The left arm portion 120 and the right arm portion 120 are provided at both of the end portions of the torsion portion 110 so as to extend therefrom. Flattened portions 121a and 121b, which are flattened by forging, are provided at leading end portions of the arm portions 120. Mounting holes 122, to which a stabilizer link is inserted and mounted, are formed on the flattened portions 121.

When a vehicle having the stabilizer apparatus 1 runs at a curve, inputs are provided to a left suspension mechanism and a right suspension mechanism (which are not shown in the Figures) so as to have phases opposite to each other in an upper direction and in a lower direction, the left arm portion 120 and the right arm portion 120 bend in directions opposite to each other, and the torsion portion 110 of the stabilizer 100 of the stabilizer apparatus 1 is twisted. In this manner, the stabilizer 100 of the stabilizer apparatus 1 functions as a spring inhibiting the roll of vehicle body 10.

The torsion portion 110 is formed to have a shape which extends linearly and which is columnar or cylindrical. Concave-convex portions 111 are formed by mechanical working or press working at a peripheral surface of the torsion portion 110. Bushes 300 are provided for mounting of the stabilizer apparatus 1 to the vehicle body 10. Movement stopper members 400 for preventing the movement of the bushes 300 are provided to the torsion portion 110.

As shown in FIGS. 4A and 4B, the concave-convex portion 111 is formed by providing a recess on two facing surfaces of the torsion portion 110. The formation of the concave-convex portion is not limited to the above embodiment in which the concave-convex portion 111 is formed by providing a recess. An embodiment may be used in which the concave-convex portion 111 is formed by providing a convex. The formation of the concave-convex portion 111 is not limited to the above embodiment in which the number of recess is one. As shown in FIGS. 11A and 11B, a corrugated concave-convex portion 112 may be used. As shown in FIGS. 12A and 12B, a groove-like concave-convex portion 113 may be used. The formation of the concave-convex portion is not limited to the above embodiment in which the recess is provided on two facing surfaces of the torsion portion 110. As shown in FIG. 13, a corrugated concave-convex portion 114 may be formed on the overall periphery of the torsion portion 110. As shown in FIG. 14, a groove-like concave-convex portion 115 may be formed on the overall periphery of the torsion portion 110.

As shown in FIG. 15, a knurling mesh concave-convex portion 116 may be formed on the overall periphery of the torsion portion 110. When the knurling mesh concave-convex portion 116 is used, the movement of the bush 300 or the movement stopper member 400 to the torsion portion 110 in the axial direction is prevented, and the rotation of the bush 300 or the movement stopper member 400 in the circumferential direction is prevented.

As shown in FIGS. 4A and 4B, the concave-convex portions 111 are respectively provided to the bush 300 and the movement stopper member 400 so that the bush 300 and the movement stopper member 400 cover the overall of the concave-convex portions 111. Specifically, convexes of the bush 300 and the movement stopper member 400 enter recesses of the concave-convex portions 111. The embodiment of the concave-convex portion 111 is not limited to the embodiment in which the bush 300 and the movement stopper member 400 cover the overall of the concave-convex portions 111. The concave-convex portion 111 may be covered with one of the bush 300 and the movement stopper member 400. The embodiment of the concave-convex portion 111 is not limited to the embodiment in which the movement stopper member 400 is provided so as to cover the overall of the concave-convex portion 111. As shown in FIG. 10B, the movement stopper member 400 may be formed so as to be shorter than the length of the recess of the concave-convex portion 111, and the movement stopper member 400 may be provided so as to cover a portion of the recess of the concave-convex portion 111.

In this manner, the convexes of the bush 300 and the movement stopper member 400 enter the recesses of the concave-convex portions 111, so that the bush 300 and the movement stopper member 400 engage with the concave-convex portions 111. Thus, even when the vehicle runs at a curve, centrifugal force is generated, and the bush 300 receives a load by the centrifugal force in the axial direction of the torsion portion 110 (the arrow direction X in FIG. 4B), the movement of the bush 300 or the movement stopper member 400 in the axial direction of the torsion portion 110 can be prevented, and the movement resistance force, by which the movement of the bush 300 from the fixed position thereof is prevented, can be realized. As a result, the stabilizer 100 can give the predetermined designed performance, so that the reliability of the stabilizer apparatus 1 can be improved.

As shown in FIGS. 10A and 10B, the concave-convex portion 111 is formed such that height difference H between the recess and the convex is about 0.5 mm to 5.0 mm. Thus, when the concave-convex portion 111 is formed by providing a recess, the movement resistance force acts by the concave-convex portion 111, and the strength of the torsion portion 110 can be also maintained. When the concave-convex portion 111 is formed by providing a convex, the stabilizer apparatus can be compact, and the interference of the stabilizer apparatus with surrounding parts thereof can be prevented. As a result, the stabilizer apparatus 1 having high reliability can be produced. The height difference H between the recess and the convex, which is about 0.5 mm to 5.0 mm, is determined by the size (the axial direction length, the diameter, or the like) of the torsion portion 110, or by the wall thickness of torsion portion 110 when the torsion portion 110 is cylindrical.

As shown in FIGS. 10A and 10B, the concave-convex portion 111 has an inclination angle θ of about 45 to 90 degrees at both of the ends of the recess thereof. Thus, even when the vehicle runs at a curve, centrifugal force is generated, and the bush 300 receives a load by the centrifugal force in the axial direction of the torsion portion 110 (the arrow direction X in FIG. 4B), the movement of the bush 300 and the movement stopper member 400 in the axial direction of the torsion portion 110 can be further prevented. As a result, the movement resistance function of the concave-convex portion 111 can be maintained, and the movement of the bush 300 or the movement stopper member 400 is also prevented, the bush 300 or the movement stopper member 400 does not receive the force from the inside thereof in the radial direction, and the breakage of the bush 300 or the movement stopper member 400 can be prevented. The inclination angle θ of the concave-convex portion 111, which is about 45 to 90 degrees, is determined by the height difference H between the recess and the convex, the strength of the bush 300, the movement stopper member 400, and the like.

As shown in FIG. 1, the bush 300 is provided at the left side and the right side of the torsion portion. The bush 300 is made of resin (for example, rubber), and the bush 300 is formed to be larger than the movement stopper member 400. The bush 300 is formed integrally to the torsion portion 110 so as to cover the overall periphery of the predetermined range of the axial direction of the torsion portion 110. As shown in FIG. 2, a U-shaped bracket 20, which is shown in FIG. 3 and covers the peripheral surface of the bush 300, is fastened to the vehicle body 10 with a bolt 30. Thus, the bush 300 is a member for fixing of the stabilizer 100 to the vehicle body 10 of the vehicle.

The movement stopper member 400 is made of resin. The resin of the movement stopper member 400 is polyphenylene sulfide, polyether ether ketone, or the like. The movement stopper member 400 is formed integrally to the torsion portion 110 so as to cover the overall periphery of the predetermined range of the axial direction of the torsion portion 110.

Since the movement stopper member 400 is integrally formed in this manner, the movement stopper member 400 does not have a connection portion, which may be a weak structure portion. Thus, strength loss of fixing of the torsion portion 110 to the stabilizer 100, which may be easily caused due to the load, can be prevented, and the bush 300 can be disposed at the desired position of the torsion portion 110. When an aluminum ring used as movement stopper member receives a load, the aluminum ring loses all ability to function as the movement stopper member. In contrast, even when the movement stopper member 400 made of resin is moved, the necessary load required by the movement of the movement stopper member 400 hardly changes. Thus, the movement stopper member 400 can maintain the movement stopper function of prevention of the movement of the bush 300 in the axial direction of the torsion portion 110 can be prevented. As a result, the stabilizer 100 can give the predetermined designed performance, so that the reliability of the stabilizer apparatus 1 can be improved.

As shown in FIG. 1, the movement stopper member 400 is provided proximate to the outside of the bush 300. That is, the movement stopper members 400 are respectively provided at the left side and the right side of the torsion portion 110, and the number of the movement stopper members 400 is two. The movement stopper member 400 has a contact portion 410 and an inclination portion (for example, tapered portion 420). The movement stopper member 400 prevents the movement of the bush 300 in the axial direction of the torsion portion 110.

The embodiment of the movement stopper member 400 is not limited to the embodiment in which the movement stopper member 400 is provided proximate to the outside of the bush 300. As shown in FIG. 6, the movement stopper member 400 may be provided proximate to the inside of the bush 300, thereby performing the movement prevention function.

The length of the movement stopper member 400 is about 10 to 15 mm. Thus, even when the vehicle runs at a curve and centrifugal force is generated, the movement of the bush 300 can be prevented by the movement stopper member 400. In this manner, the movement resistance force acts by the movement stopper member 400, and the movement stopper member 400 can be also compact. The straight length of the torsion portion 110 of the stabilizer 100 other than the bush 300 can be as short as possible, and the stabilizer 100 can be compact. As a result, the weight of the stabilizer apparatus 1 can be reduced. The length of the movement stopper member 400 is determined in accordance with the movement resistance force which is required for preventing the movement of the bush 300 which is caused by the centrifugal force when the vehicle runs at a curve.

Since the concave-convex portion 111 is provided at the contact portion between the torsion portion 110 and the bush 300 and at the contact portion between the torsion portion 110 and the movement stopper member 400, even when the movement stopper member 400 is short, the movement resistance force can be high. Thus, the length of the movement stopper member 400 can be shorter.

As shown in FIGS. 5A and 5B, the contact portion 410 is formed in a flanged shape. The side surface of the bush 300 contacts the side surface of the contact portion 410. The contact portion 410 has a portion which is thickest at the movement stopper member 400 and which has a thickness of about 3 to 5 mm. Thus, the contact area of the contact portion 410, which functions as the movement stopper member 400, on the bush 300 is secured, the movement stopper member 400 can be compact, and the interference of the movement stopper member 400 with surrounding parts thereof can be prevented. As a result, the weight of the stabilizer apparatus 1 can be reduced.

As shown in FIGS. 5A and 5B, the tapered portion 420 is formed so as to be tapered. That is, the tapered portion 420 is disposed opposite to the bush 300 via the contact portion 410 and has an outer diameter which is smaller with increasing distance from the bush 300.

The embodiment of the inclination portion is not limited to the tapered portion 420, and the following inclination portion may be provided. As shown in FIGS. 7A and 7B, a radial portion 520 may be provided so as to have a cross section of which wall thickness is more reduced than the tapered portion 420 and which thereby has a radial shape. Alternatively, as shown in FIGS. 8A and 8B, a tapered rib 620 of which wall thickness is more reduced than the tapered portion 420 and the radiation shape portion 520 is provided. Alternatively, as shown in FIGS. 9A and 9B, a rib 720 may be provided so as to have an inclination portion having a radiation shape cross section.

In this manner, useless stock is removed as much as possible, so that the interference of the movement stopper member with surrounding parts thereof can be prevented, and production cost can be reduced by the weight reduction of the movement stopper member and the reduction of use resin. In coating after forming of the movement stopper member, coating unevenness, which may occur proximate to the movement stopper member by the movement stopper member functioning as a shield, can be prevented.

Regarding the weight reduction of the movement stopper member, for example, when a movement stopper member made of aluminum is designed so as to be provided to a stabilizer having a diameter of 25.4 mm, the movement stopper member has a cylindrical shape having a thickness of 5.0 mm and a length of 15.0 mm and has a weight of 16 gram. On the other hand, when a cylindrical movement stopper member made of resin is designed so as to be provided to a stabilizer having a diameter of 25.4 mm, the weight of the movement stopper member is 9 g. Thus, in this case, the weight reduction is about 7 gram per one piece. Therefore, since the number of the movement stopper member provided is two per one stabilizer, the weight reduction is about 14 gram.

The movement stopper member 400 can be higher than the conventional movement stopper member of an aluminum ring or an iron ring in frictional force and movement resistance force. This will be explained with reference to FIGS. 4A and 4B.

When centrifugal force acts on the vehicle body 10 and the bush 300 receives a load by the centrifugal force in the axial direction of the torsion portion 110 (the arrow direction X in FIG. 4B), as shown in FIG. 4B, the bush 300 bends toward the movement stopper member 400. Thus, a load is applied onto the peripheral side portion of the contact portion 410, so that the moment acts on the movement stopper member 400 toward the axial direction of the torsion portion 110 (the arrow direction Y in FIG. 4B). That is, the peripheral surface of the torsion portion 110 is pressed by the inner peripheral surface of the movement stopper member 400, and a load is applied from the movement stopper member 400 to the torsion portion 110. Therefore, the frictional force between the torsion portion 110 and the movement stopper member 400 is increased, thereby being higher. As a result, the movement of the bush 300 can be prevented, and the reliability of the stabilizer apparatus 1 can be improved.

The peripheral surface of the torsion portion 110 is pressed by the inner peripheral surface of the movement stopper member 400, and a load is applied from the movement stopper member 400 to the torsion portion 110, so that the movement stopper member 400 strongly engages with the concave-convex portion 111, and the movement resistance force by the movement stopper member 400 can be high. As a result, the movement of the bush 300 can be further prevented, and the reliability of the stabilizer apparatus 1 can be further improved.

Production Method for Stabilizer Apparatus

Figure 16A:
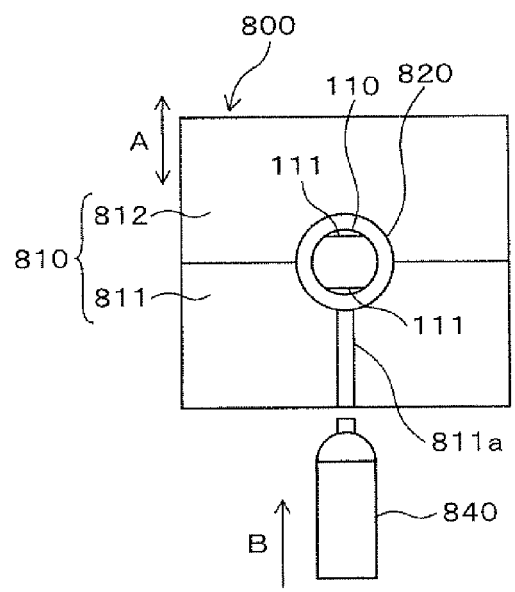
FIGS. 16A and 16B are diagrams which show an injection molding machine.
Figure 16B:
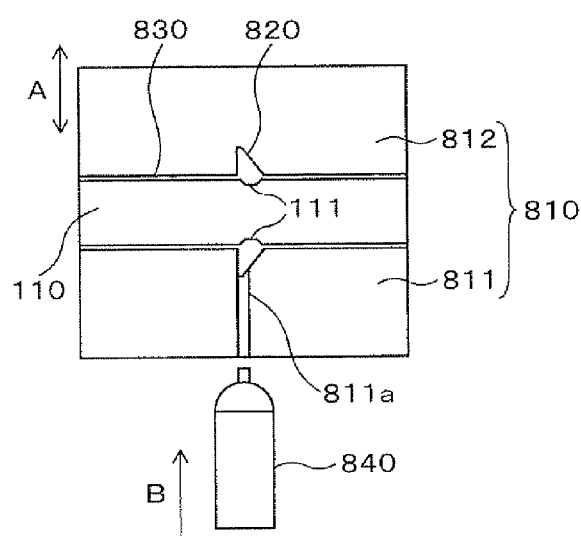
Figure 17:
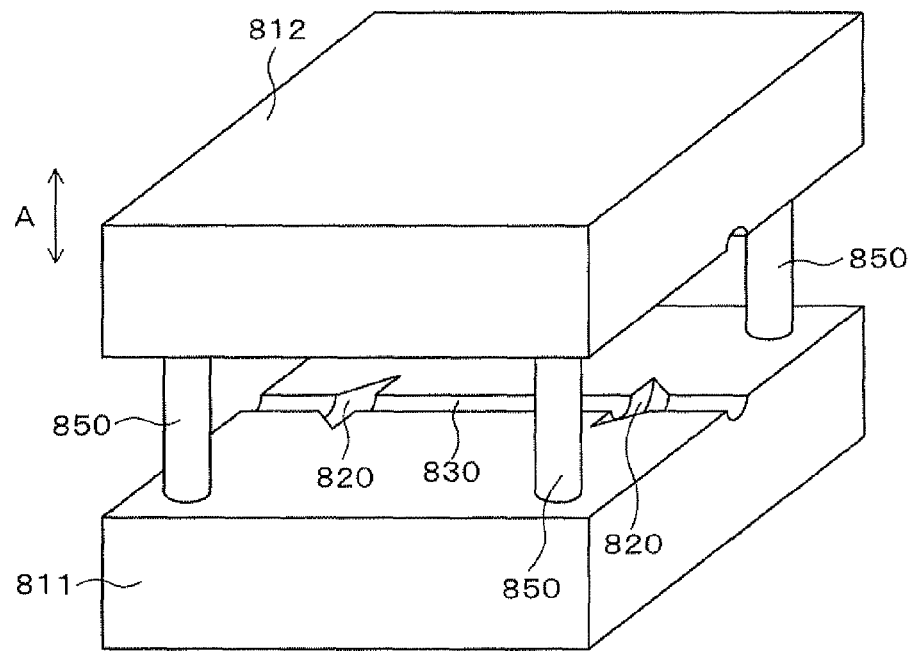
FIG. 17 is a perspective view showing a die.
Figure 18:
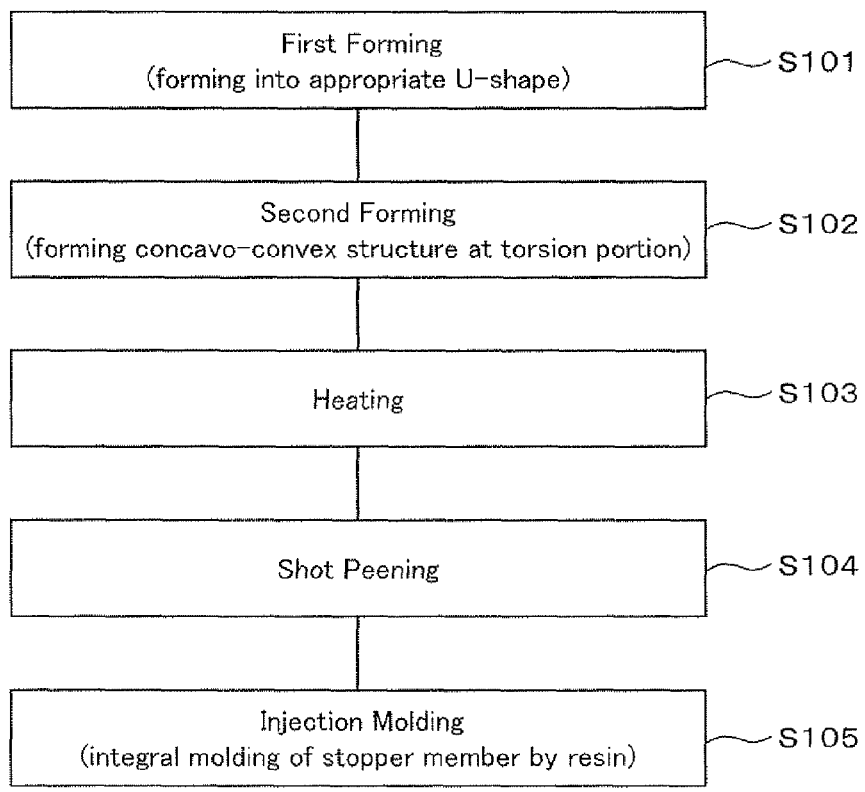
FIG. 18 is a flow chart which shows a portion of a production method for stabilizer apparatus.

A portion of production method for stabilizer apparatus 1 will be explained with reference to Figures. Processes from forming to coating will be explained. FIGS. 16A and 16B are diagrams which show an injection molding machine. FIG. 16A shows a cross sectional construction of the injection molding apparatus which is taken in the direction perpendicular to the axial direction of the torsion portion, and FIG. 16B shows a cross sectional construction of the injection molding apparatus which is taken in the axial direction of the torsion portion. FIG. 17 is a perspective view showing a die. FIG. 18 is a flow chart which shows a portion of a production method for stabilizer apparatus.

With reference to FIGS. 16A, 16B and 17, an injection molding apparatus 800 will be explained. By direct injection using the injection molding apparatus 800, the movement stopper member 400 is formed on a half-finished stabilizer. The injection molding apparatus 800 is equipped with a die 810, an injection machine 840, an elevating mechanism 850, and the like. The die 810 has a lower die 811 and an upper die 812. A gate 811*a* is provided in the lower die 811. The lower die 811 and the upper die 812 are equipped with a recess and a grip portion 830. The recess is a portion of cavity 820 used for forming of the movement stopper member 400 into a predetermined shape. The grip portion 830 is provided so as to be connected to the cavity 820 and supports a shoulder portion of the half-finished stabilizer.

The injection machine 840 is an apparatus for injection of resin to the cavity 820 of the die. The elevating mechanism 850 is provided at the four corners of the die 810. The elevating mechanism 850 moves the upper die 812 upward and downward in the arrow direction A shown in FIGS. 16A, 16B, and 17. The elevating mechanism 850 is provided so as to have a predetermined interval such that the half-finished stabilizer can pass through the space between the elevating mechanisms 850 along the formation direction of the grip portion 830.

When the upper die 812 is moved upward in the arrow direction A (shown in FIGS. 16A and 16B) by the elevating mechanism 850, the upper die 812 moves apart from the lower die 811. When the upper die 812 is moved downward in the arrow direction A (shown in FIGS. 16A and 168) by the elevating mechanism 850, the upper die 812 contacts the lower die 811. When the upper die 812 contacts the lower die 811, the cavities 820 having a predetermined shape are formed for forming of the movement stopper member 400 into a predetermined shape.

A portion of the production method for the stabilizer 1 will be explained with reference to FIG. 18. In the production method for the stabilizer 1, first, first forming is performed on a bar (step S101). For example, a bar (for example, electroseamed pipe), which has a predetermined length by cutting, is subjected to cold working. Thus, the bar is formed into an approximate U-shape, so that a half-finished stabilizer is obtained. Next, second forming is performed on the half-finished stabilize (step S102). For example, a concave-convex portion 111 is formed at a shoulder portion of the torsion portion 110 of the half-finished stabilizer by rolling or using a two-divided press die. Next, heating is performed on the half-finished stabilizer (step S103). For example, the half-finished stabilizer is subjected to heating (for example, hardening and tempering). Next, shot peening is performed on the half-finished stabilizer (step S104). For example, shots are projected onto the half-finished stabilizer, so that burr or the like on the surface of the torsion portion 110 is removed, and the torsion portion 110 is subjected to surface roughening.

The embodiment of the forming is not limited to the embodiment in which the second forming for forming of the concave-convex portion 111 is performed after the first forming for forming into an approximate U-shape. The first forming and the second forming may be performed at the same time.

Next, injection molding is performed on the half-finished stabilizer subjected to the above processing (step S105). For example, the half-finished stabilizer is set in the injection molding apparatus 800, and the movement stopper member 400 is integrally molded by direct injection of resin.

In the injection molding, first, the shoulder portion of the half-finished stabilizer is set so as to be positioned at the grip portion 830 of the die 810. Next, the upper die 812 is moved downward in the arrow direction A (shown in FIG. 17) by the elevating mechanism 850, and the upper die 812 contacts the lower die 811, so that the cavities 820 are formed. Next, the injection machine 840 is moved in the arrow direction B (shown in FIGS. 16A and 16B), the leading end of the injection machine 840 is inserted into the gate 811*a* of the lower die 811, and the resin is injected from the gate 811*a* to the cavity 820. In this case, the resin is also injected to the cavity 821. Thus, the movement stopper member 400 having the contact portion 410 and the tapered portion 420 is molded to the half-finished stabilizer.

In this case, the resin for the movement stopper member 400 enters the recess of the concave-convex portion 111, so that the convex is formed on the movement stopper member 400. In this manner, the convex of the movement stopper member 400 enters the recess of the concave-convex portion 111, and the movement stopper member 400 engages with the concave-convex portion 111. Therefore, in comparison with caulking of the aluminum ring having a convex formed thereon, a gap between the concave-convex portion 111 and the movement stopper member 400 is smaller and the concave-convex portion 111 and the movement stopper member 400 more strongly engage with each other, so that the movement resistance force can be more stable. As a result, the movement of the bush 300 can be prevented, and the reliability of the stabilizer apparatus 1 can be improved.

In this case, a gap between the shoulder portion of the half-finished stabilizer and the grip portion 830 is 0.6 mm or less. Thus, the resin injected to the cavity 820 does not flow into the grip portion 830, and burr is not generated. For example, in a case in which the movement stopper member 400 has a length of about 10 mm is used, even when the angle between the axes of the movement stopper member 400 and the shoulder portion is 3 or 4 degrees, the movement stopper member 400 can be formed. Therefore, when the movement stopper member is one which has a length of about 10 mm and which is made of resin, the diameter tolerance of the shoulder portion, the bentness, or the like, are widely allowed. The removal process of burr can be omitted. As a result, the stabilizer apparatus 1 can be produced at low cost.

Next, the half-finished stabilizer and the movement stopper member 400 are subjected to coating. The embodiment of the coating is not limited to the embodiment in which the coating is performed after the injection molding. An embodiment of the coating may be used in which the coating is performed after the shot peening and the injection molding is performed after the coating. Even when the injection molding is performed after the coating, the movement stopper member 400 engages with the concave-convex portion 111, so that it is unnecessary to use the movement resistance force by engagement of the movement stopper member 400 with fine concave-convex formed on the half-finished stabilizer by the shot peening. Since the direct injection is performed on the coating, even when the thickness of the coating changes, the adhesion degree of the movement stopper member 400 to the torsion portion 110 does not change, and the movement resistance force does not change.

When the die has a die for forming of the cavity 820 and a die for forming of the grip portion 830, which can be separated, the number of the dies for forming of the cavity 820 can be reduced to ⅓ to ¼ of variation of dies for forming of aluminum ring, so that processes such as initial step or the like can be efficiently performed. As a result, production efficiency of the stabilizer apparatus 1 can be improved.

The bushes may be integrally formed by the above production method. Alternatively, injection molding may be performed in which the bush made of rubber is integrally formed by the direct injection so as to engages with the concave-convex portion, and then heat curing may be performed after the injection molding.

2. Second Embodiment

Figure 19:
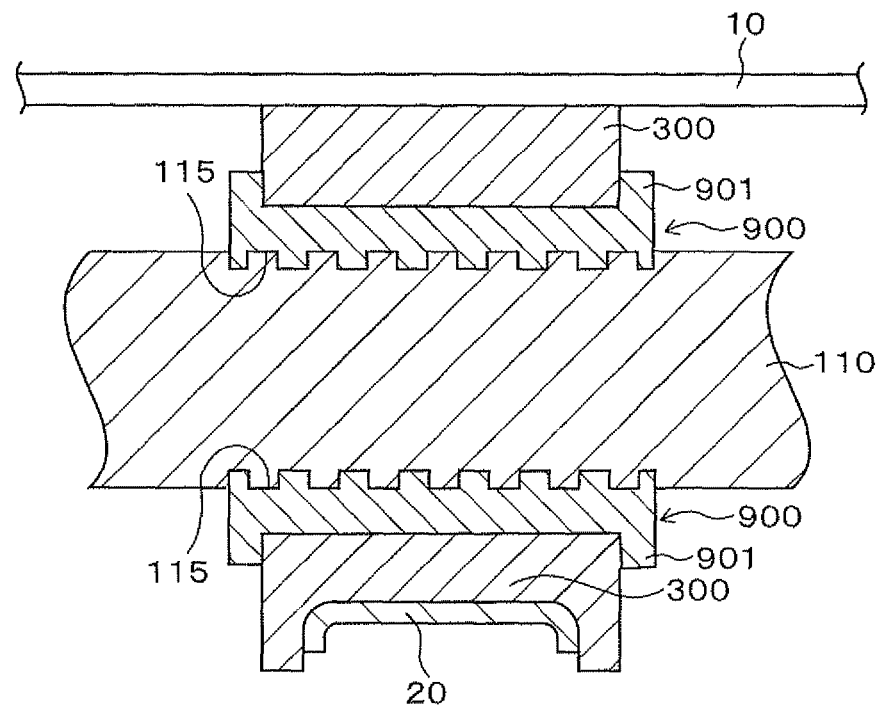
FIG. 19 is a cross sectional view which shows a stabilizer apparatus of the second embodiment.

The stabilizer apparatus of the second embodiment is a modified one of the first embodiment. Therefore, main modified portions will be explained, and the same construction and the action as those of the first embodiment will be omitted. FIG. 19 is a cross sectional view which shows the stabilizer apparatus of the second embodiment.

As shown in FIG. 19, a groove-like concave-convex portion 115 is provided at the overall periphery surface of the torsion portion 110. Only movement stopper member 900 for preventing of the movement of the bush 300 is provided at the torsion portion 110. The movement stopper member 900 engages with the concave-convex portion 115. For example, the movement stopper member 900 has a recess 901 as a contact portion at the periphery side. The embodiment of the contact portion is not limited to the recess 901, and a convex may be used as a contact portion.

The bush 300 has a cylindrical shape. The bush 300 engages with the recess 901 of the movement stopper member 900, and the bush 300 covers the periphery surface of the movement stopper member 900. For example, the bush 300 fits the recess 901 having flange portions at both sides thereof, and the bush 300 covers the periphery surface of the movement stopper member 900. The bracket 20 has a U-shape and covers the periphery surface of the bush 300.

In the second embodiment, even when the vehicle runs at a curve, centrifugal force is generated, and the bush 300 receives a load by the centrifugal force in the axial direction of the torsion portion 110, the recess 901 of the movement stopper member 400 contacts the bush 300 and thereby prevents the movement of the bush 300 in the axial direction of the torsion portion 110. The movement stopper member 900 engages with the concave-convex portion 115, the movement of the movement stopper member 900 in the axial direction of the torsion portion 110 is prevented, and the movement resistance force, by which the movement of the bush 300 from the fixed position thereof is prevented, can be realized. As a result, the stabilizer 100 can give the predetermined designed performance, so that the reliability can be improved. Since it is unnecessary to secure a portion for providing only the movement stopper member, the movement resistance force is maintained, the straight length of the torsion portion 110 of the stabilizer 100 other than the movement stopper member 400 can be also as short as possible, and the stabilizer 100 can be compact.

INDUSTRIAL APPLICABILITY

The present invention can be used for a stabilizer apparatus provided to a vehicle such as a car or the like.

The invention claimed is:

1. A stabilizer apparatus comprising:
a stabilizer which has a torsion portion and arm portions extending from both end portions of the torsion portion such that the stabilizer has an approximate U-shape;
a bush which is provided at both the end portions of the torsion portion and is used for fixing the stabilizer to a vehicle body; and
a movement stopper member which is made of resin, has a contact portion contacting the bush, and is integrally molded to the torsion portion so as to cover an overall periphery of predetermined range of the torsion portion in an axial direction of the torsion portion, wherein
a concavo-convex structure engaging with the movement stopper member is provided on a peripheral surface of the torsion portion that is mechanically worked or press worked.

2. A stabilizer apparatus comprising:
a stabilizer which has a torsion portion and arm portions extending from both end portions of the torsion portion such that the stabilizer has an approximate U-shape; and
a bush which is made of resin and is integrally molded to the torsion portion so as to cover an overall periphery of predetermined range of the torsion portion in an axial direction of the torsion portion, wherein
a concavo-convex structure engaging with the bush is provided on a peripheral surface of the torsion portion that is mechanically worked or press worked.

3. A stabilizer apparatus according to claim 1, wherein the concavo-convex structure has a recess and a convex, and height difference between surfaces of the recess and the convex of the concavo-convex structure is 0.5 to 5.0 mm.

4. A stabilizer apparatus according to claim 1, wherein the movement stopper member has an inclined portion at a side of the bush such that the contact portion is disposed between the bush and the movement stopper member, and the inclined portion has an outer diameter which is smaller with increasing distance from the bush in the axial direction of the torsion portion.

5. A stabilizer apparatus according to claim 1, wherein the contact portion is a recess or a convex provided at a periphery side of the movement stopper member, and the bush engages with the recess or the convex of the movement stopper member so as to cover a periphery surface of the movement stopper member.

6. A production method for a stabilizer apparatus, comprising:
first, forming a bar into an approximate U-shape to form a half-finished stabilizer;
second, forming a concavo-convex structure by mechanical working or press working on a shoulder portion of a torsion portion of the half-finished stabilizer;
heating the half-finished stabilizer;
shot peening the half-finished stabilizer such that shots are projected onto the half-finished stabilizer; and
injection molding the half-finished stabilizer such that a movement stopper member is integrally molded to the concavo-convex structure of the shoulder portion of the torsion portion by direct injection of resin so as to engage the movement stopper member with the concavo-convex structure.

7. A production method for a stabilizer apparatus, comprising:
first, forming a bar into an approximate U-shape to form a half-finished stabilizer;
second, forming a concavo-convex structure by mechanical working or press working on a shoulder portion of a torsion portion of the half-finished stabilizer;
heating the half-finished stabilizer;
shot peening the half-finished stabilizer such that shots are projected onto the half-finished stabilizer; and
injection molding the half-finished stabilizer such that a bush is integrally molded to the concavo-convex structure of the shoulder portion of the torsion portion by direct injection of resin so as to engage the bush with the concavo-convex structure.

8. A stabilizer apparatus according to claim 2, wherein the concavo-convex structure has a recess and a convex, and height difference between surfaces of the recess and the convex of the concavo-convex structure is 0.5 to 5.0 mm.

* * * * *